April 7, 1953 J. K. MINOR 2,633,926
TRACTOR POWER TAKE-OFF
Filed July 21, 1947 5 Sheets-Sheet 1
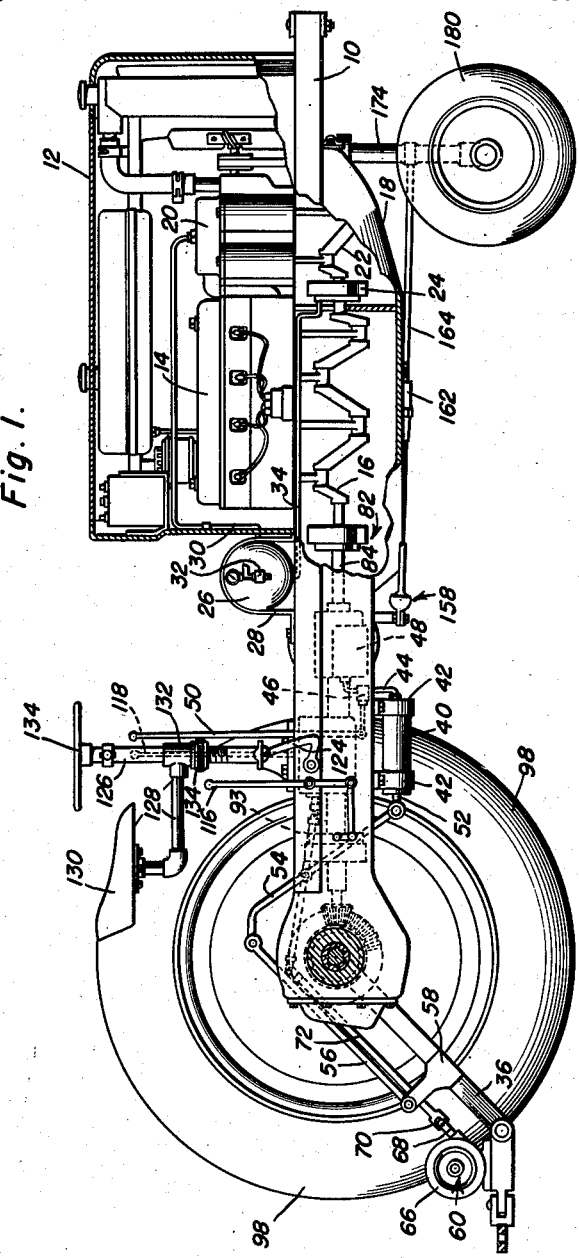
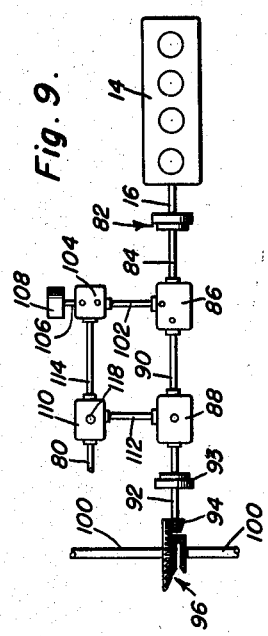
Inventor
James K. Minor
By *Clarence A. O'Brien and Harvey B. Jacobson*
Attorneys

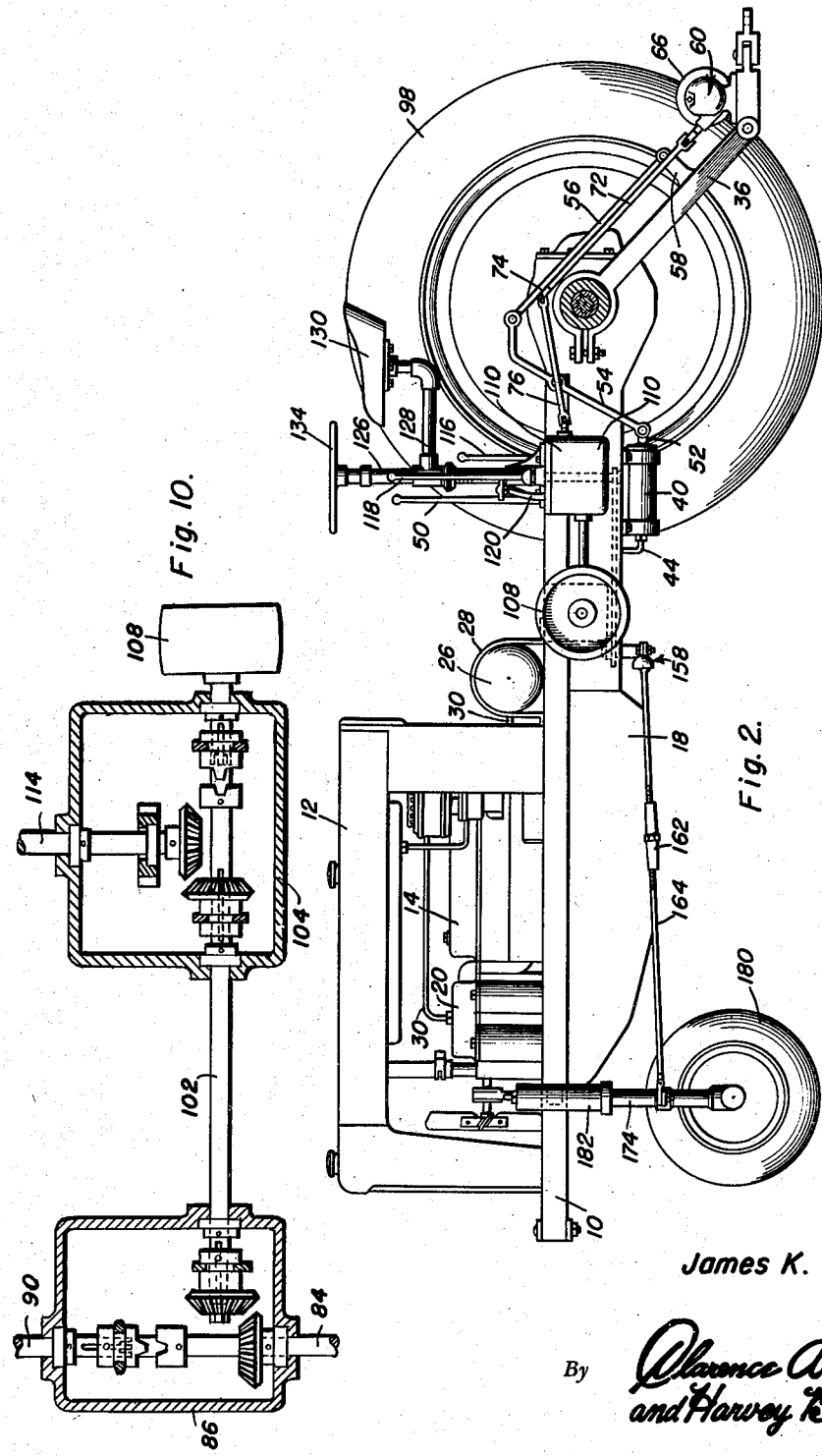

April 7, 1953 J. K. MINOR 2,633,926
TRACTOR POWER TAKE-OFF
Filed July 21, 1947 5 Sheets-Sheet 3
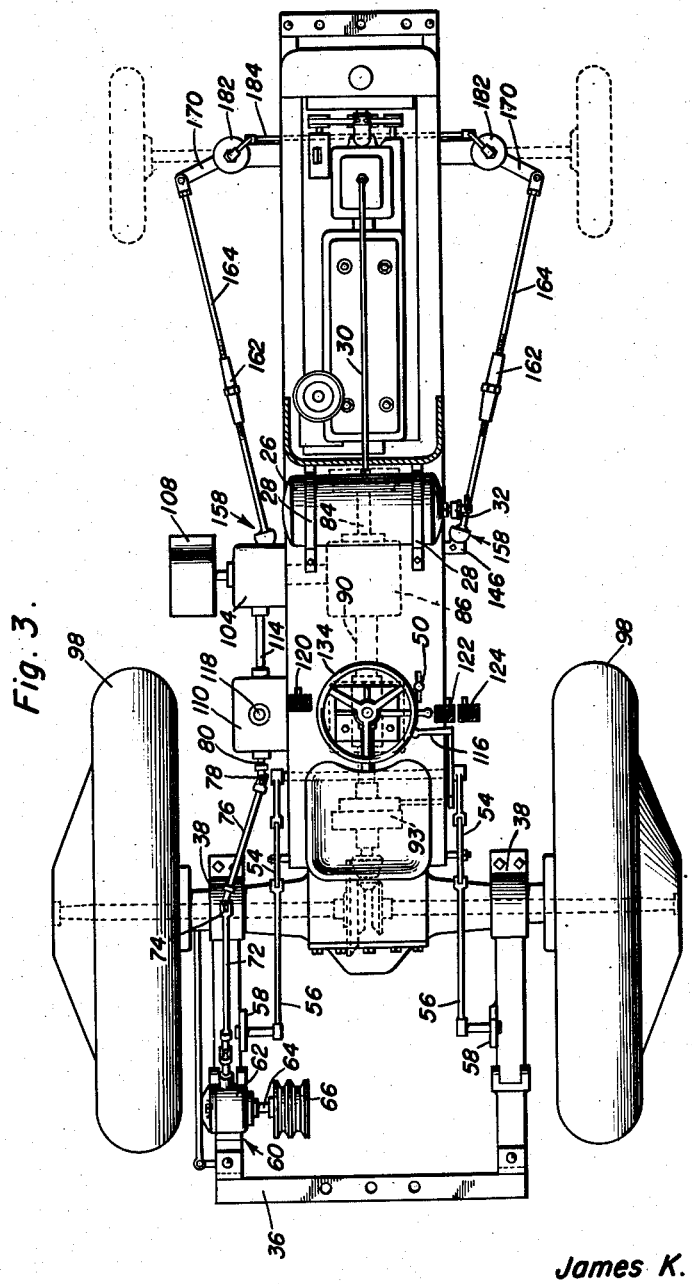
Inventor
James K. Minor
By Clarence A. O'Brien
and Harvey B. Jacobson
Attorneys April 7, 1953        J. K. MINOR        2,633,926

TRACTOR POWER TAKE-OFF

Filed July 21, 1947        5 Sheets-Sheet 4

Inventor

James K. Minor

By Clarence A. O'Brien and Harvey B. Jacobson

Attorneys

April 7, 1953            J. K. MINOR            2,633,926
TRACTOR POWER TAKE-OFF
Filed July 21, 1947            5 Sheets-Sheet 5
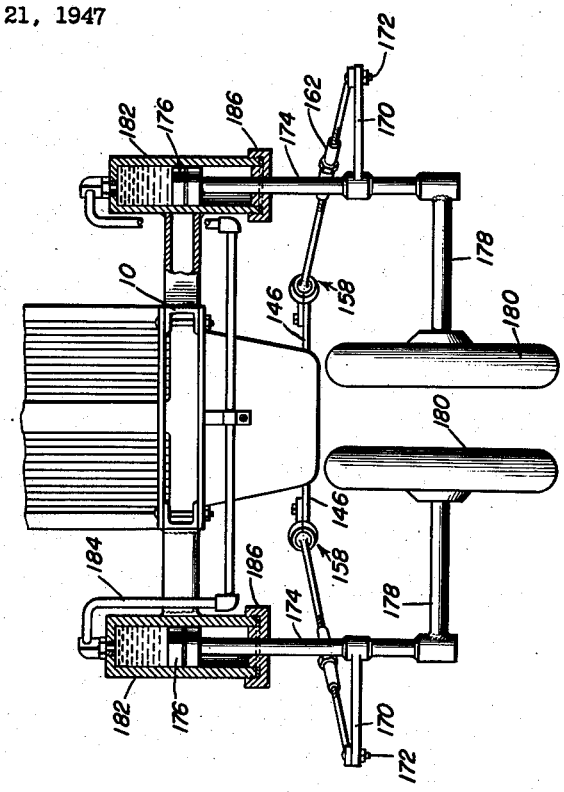
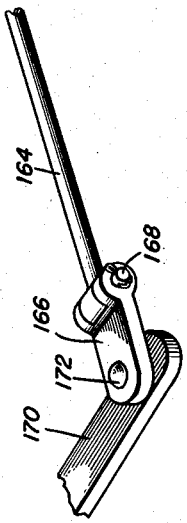
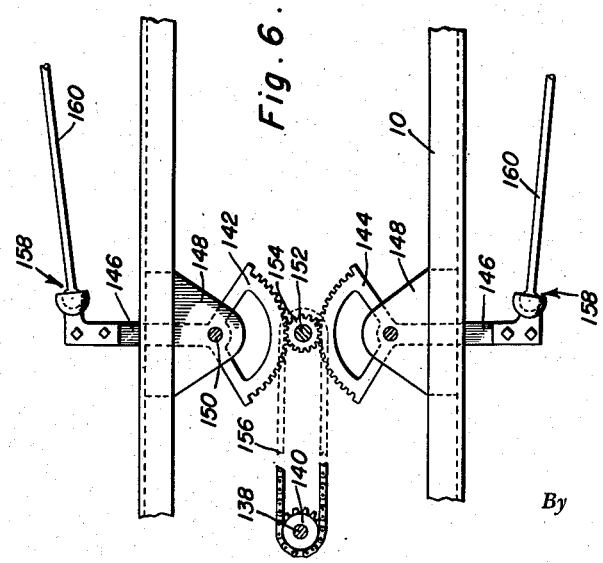
Inventor
James K. Minor
By Clarence A. O'Brien
and Harvey B. Jackson
Attorneys

Patented Apr. 7, 1953

2,633,926

UNITED STATES PATENT OFFICE 2,633,926

TRACTOR POWER TAKE-OFF

James K. Minor, River Rouge, Mich.

Application July 21, 1947, Serial No. 762,503

5 Claims. (Cl. 180—53)

This invention relates to novel and useful improvements in agricultural implements and has for its general purpose to provide means for rendering certain farm operations expedient, simple, and relatively easy.

Another purpose of this invention is to provide means for retaining a cultivator or similar farm implement on a tractor and means for actuating said farm implement in close proximity to the coupling of the farm implement and tractor.

Another object of this invention is to provide means for driving a towed implement thereby obviating the necessity of traction wheels on said implement.

Another object of this invention is to provide improved transmission means for selectively controlling the actuation of said power take-off, said transmission means arranged in order that said power take-off may be actuated by the prime mover without forward or backward motion of said tractor.

Ancillary objects and features of novelty shall become apparent to those skilled in the art, in following the description of the preferred form of the present invention, illustrated in the accompanying drawings, wherein:

Figure 1 is an elevational side view of the preferred form of the present invention, portions being shown broken away to illustrate details of construction;

Figure 2 is an elevational side view showing the reverse side of the invention;

Figure 3 is a plan view of the preferred form of the invention;

Figure 6 is a plan view of the steering mechanism showing a portion thereof;

Figure 7 is a front view of the invention disclosed in Figure 1, portions being shown in section to illustrate details of construction;

Figure 8 is a perspective view of a portion of the steering linkage utilized in this invention; and Figure 9 is a plan schematic view showing particularly the transmission means forming part of the present invention.

Figure 10 is a view, partly in section, of a portion of the transmission means.

Figure 4:
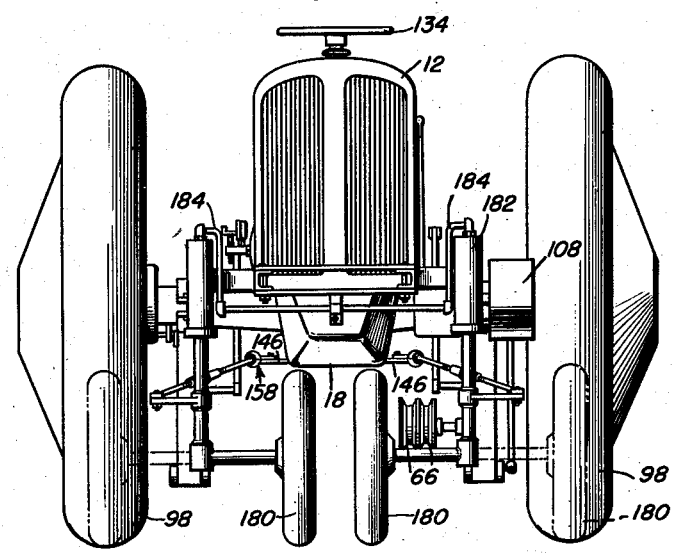
Figure 4 is a front view of the invention.
Figure 5:
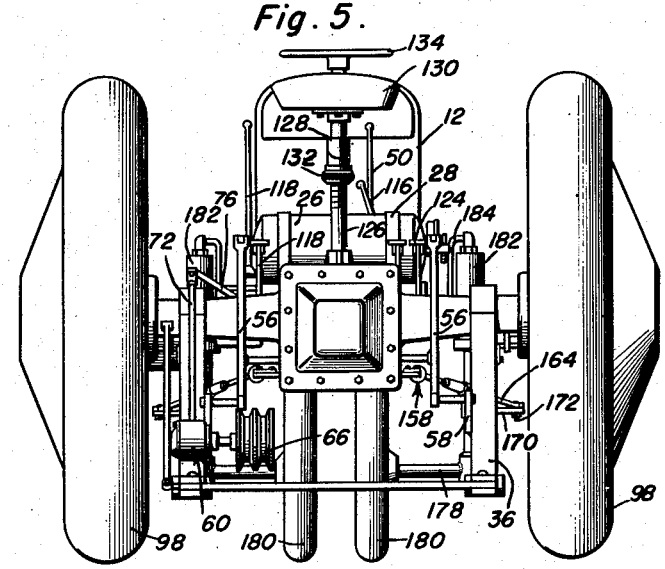
Figure 5 is a rear view thereof.

Referring now in detail to the illustrated preferred embodiment of the present invention, like reference characters are used throughout to illustrate similar elements. This invention has been developed to provide a device for rendering farming operations relatively easy and inexpensive, the expense or saving resulting in the preclusion of many elements of conventional implements required when utilized with the ordinary, conventional tractor. As is well known, many farm implements rely on traction wheels to produce torque for actuation thereof. In the present invention, a drawbar is pivoted to the rear portion of a tractor and a power take-off means is supplied on said drawbar. This power take-off may be utilized for producing the necessary torque appurtenant to the actuation of many conventional farm implements. By this expedient, the wheels, differential, associated axles and many other links may be obviated in conventional farm implements and simple skids substituted in lieu thereof.

It is noted at this point that the present invention provides a tractor which may be actuated forward or backward selectively with equal dexterity and facility. All of the control links as well as the seating means are provided at an advantageous position and the controllable seat provides means for positioning the operator that he may be facing the direction of movement of the tractor.

A tractor chassis 10 is provided with a cowl 12 having an internal combustion engine 14 positioned thereunder. The internal combustion engine is supplied with appurtenances contiguous thereto which may also be provided beneath the cowl 12. A crank shaft 16 extends from the said internal combustion engine 14 and a suitable pan 18 is provided thereover. An air compressor 20, conventional in nature, is provided in tandem with the internal combustion engine 14. A drive shaft 22 is provided at the lower portion of the said compressor 20 and a fluid clutch 24 is interposed between the crank shaft and the drive shaft.

A storage tank 26 is secured to the chassis 10 and retained in place by utility of a plurality of straps 28. A conduit 30 communicates the said tank 26 with the outlet side of the pump or compressor means 20. Valve means 32 is provided in said tank 26 for the purpose of readily attaching spray guns and the like thereto and for controlling the flow of compressed air through said attached spray gun.

Means for actuating the compressor means 20 in accordance with the pressure within the tank 26 is provided. The pressure responsive means is viewed in Figure 1 wherein there is disclosed the above mentioned hydraulic coupling or clutch 24. A conduit 34 extends from the lower portion of the said tank 26 to the appropriate side of the conventional liquid clutch 24. The operation of this portion of the invention is deemed quite apparent in that as soon as the pressure within the tank 26 reaches a predetermined value, the appropriate clutch elements will be rendered operative and the compressor means 20 will be actuated. By this expedient, the pressure in the tank 26 may be maintained at a predetermined value.

A drawbar 36 is pivoted to the chassis and hydraulic actuation means is associated therewith. It will be noted that suitable bearings 38 are supplied at the terminal portions of the said drawbar for the purpose of engaging specifically, the axle housing in the tractor.

A hydraulic cylinder 40 is secured to the under carriage of the tractor by any suitable conventional means such as the bracket 42 disclosed in Figure 1. A conduit 44 extends from one end of the cylinder 40 through a control valve 46 thence to a reservoir 48. A control rod 50 extends from the said valve 46 through suitable linkage for the purpose of regulating the said valve 46. Appropriate conventional pressure means may be derived from the prime mover or internal combustion engine 14 for the purpose of applying force within the cylinder 40.

The piston 52 within the cylinder terminates in a pivotal joint having a lever 54 within this junction. The said lever 54 is pivoted to the chassis 10 and the pitman 56 is secured to the opposite end of the said lever 54. An adjustable clamp means 58 is supplied on the drawbar 36 for the purpose of communicating and transmitting movement from the said piston 52 to the drawbar 36.

A power take-off 60 is secured to the said drawbar 36 and may be conventional in nature. In fact, the preferable form is disclosed in Figure 3 wherein there is a conventional gear box 62 having a shaft 64 extending therefrom and double sheave means 66 fixed to the said shaft 64. A stub shaft 68 extends from the said power take-off means 60 and a universal joint 70 is received on the end thereof. The counterpart 72 of the said universal joint 70 extends to a second universal joint 74 which has a torque tube 76 protruding therefrom. This torque tube terminates in still another universal joint 78. Attached to this last mentioned universal joint 78 is a short shaft 80 which extends to the transmission means.

The said transmission means forms an important part of the present invention and will be described in detail at this time. For the best understanding of the said transmission means, reference is made primarily to Figure 9 wherein a schematic showing of the same is present. Going from the internal combustion engine 14 the crank shaft 16 is viewed terminating in a conventional clutch 82. From this clutch 82 extends a shaft 84 which terminates in a gear box 86. Received in this gear box are suitable gears and shafts which are in themselves conventional. A second gear means 88 is supplied and a shaft 90 interconnects the first and second gear means. From this second gear means 88 extends another shaft 92 which terminates in a bevel gear 94. The said bevel gear 94 engages a suitable ring and pinion construction 96 useful for driving the back wheels 98 of the tractor. Of course, suitable axles 100 extend from the ring and gear construction for this purpose.

It is noted at this point that the said rear wheels of the tractor are interchangeable in nature and are reversible in order to provide varying widths of the rear portion of the tractor.

Going now again to the transmission means, a shaft 102 extends from the first gear means 86 to a fourth gear means 104 and a suitable shaft 106 extends from said fourth gear means 104. A conventional pulley or the like 108 may be supplied to this last mentioned shaft 106 for the obvious purpose of being utilized as another ancillary power take-off. Extending from the second gear means 88 to the third gear means 110 is a shaft 112 which couples the second and third gear means. Then, another shaft 114 couples the third gear means 110 and fourth gear means 104.

Torque derived from the crankshaft 16 is transmitted to the gear means 86, thence to the fourth gear means 104, thence to the third gear means 110. From this last mentioned gear means 110 the said torque is transmitted to the shaft 80 and then to the power take-off means 60 as described above. Torque transmitted from the first gear means 86 is produced in the second gear means 88 thence is transferred to the rear wheels of the tractor as described hereinbefore. Figure 10 shows one example of how certain of the shafts connecting the gear means may be selectively engaged and disengaged, although it is obvious that many other arrangements will occur to one in the art. It is noticed that by the arrangement of transmission gear means, many permutations may be achieved. If desired, the power take-off means 60 may be actuated in the absence of forward or backward motion of the tractor since the torque is transmitted in this instance through the shafts 102, 114 and 80 while shafts 90 and 112 are idle.

If found desirable, the power take-off means 108 may be utilized in the absence of forward motion of the tractor and in the absence of movement in the power take-off means 60. Or, if so desired, both of said power take-off means may be utilized with movement of the tractor by actuating shafts 90, 112 and 114 and disengagement of shaft 102. Both of said power takeoff means may be utilized without movement of the tractor by actuation of shafts 102, 114, 80 and disengagement of shafts 90 and 112. One of said power takeoff means may be operated with or without movement of the tractor; for example, power takeoff 108 can be actuated directly through shaft 102 while shafts 90 and 80 remain idle, or may be operated through shafts 90, 112 and 114 while shafts 102 and 80 remain idle.

Of course, any conventional clutch 93 must be employed in connection with the second power take-off means 88 and a suitable conventional actuating rods 116 extends therefrom. Also, a conventional power take-off gear ratio shift lever 118 extends from the said third gear means 110. Of course, conventional clutch means may be associated therewith and a clutch actuating lever or pedal 120 also extends from the gear box 110.

Means for actuating the clutch 82 for the purpose of engaging and disengaging the clutch plates is provided. This means consists of appropriate conventional levers terminating in a clutch pedal 122. A similar pedal 124 is provided adjacent the said clutch pedal 122 for the purpose of actuating the brakes which are associated with the tractor.

It is observed that all of the actuating levers in this invention are clustered in order to provide access thereof in a single position. As described above, the invention is adapted to be actuated both forward and rearward with equal facility and the said actuating levers are provided adjacent one another for easy and dexterous manipulation thereof.

Provided within the cluster of actuating levers is a stand 126 which has a perch 128 rotatably received thereon. This perch 128 terminates in a seating means 130 and a threaded bearing 132. This bearing is received on threads on the periphery of the said stand 126 and consequently, the seat means is rotatable about said stand. Also, a locking means, illustrated as a lock screw, is provided for the purpose of abutting the bearing 132 thereby holding the same in the desired fixed position. By this construction it is quite apparent that the operator of the invention may be facing in the direction of movement of the tractor.

A steering wheel 134 extends from the said bracket 126 and has the obvious function of manipulating the front wheels of the invention.

Going to Figure 6 there is disclosed a shaft 138 which extends through the said stand or support 126. This shaft 138 terminates in a gear 140 which is engageable with gear segments 142 and 144, respectively. The said gear segments have arms 146 extending therefrom and the said arms are pivoted to suitable brackets 148 which are in turn secured to the chassis 10. Of course, any suitable pivot pin 150 may be employed in this last mentioned pivotal connection. The gear segments 142 and 144, respectively, engage the said gear 140 thereby imparting a turning movement to the said gear segments upon rotation of the steering wheel 134. If desired, the structure illustrated in Figure 6 may be utilized wherein there is disclosed a second stub shaft 152 having a gear 154 secured thereto and chain means 156 entrained over the said gears 140 and 154. Also operatively associated with the gear 154 is the gear segment means 142 and 144, respectively.

Ball and socket connections, generally indicated at 158, are supplied at the terminal portions of the said arms 146. Rods 160 extend from said ball and socket connections to suitable lengthening means 162. Second rods 164 extend from said lengthening means 162 and terminate in bearing members 166. At the terminal portion of each of the said rods 164 there is a pivot pin 168 extending through the said bearing members 166. These pivot pins 168 are detachable in nature for the purpose to be set forth at this time.

Going to Figure 8 it is noted that the bearing members 166 are pivoted to a link 170 through the utility of a conventional pivoting means or bolt 172. The links 170 are rigidly secured to piston rods 174 having piston heads 176 secured thereto. At the lower portions of the said piston rods 174 right angular extensions 178 are provided. Wheels 180 are journaled at the terminal portions of the said extensions 178. Going now to Figures 4 and 3, it will be noted that the said wheels 180 are selectively adjusted in order to be aligned and offset relative to the back wheels 98. All that is necessary to effect this adjustment is simply to remove either the pivot pin 186 and turn the piston rod along with the associated wheel 180. Or, remove the pivot pin 172 and perform the same function.

The said piston heads and a portion of the rods 174 thereof are provided in cylinders 182, which are secured to a suitable portion of the chassis 10.

It will be noted that by the adjustment of the forward wheels of the said tractor, the tractor may be adapted for various and sundry farm purposes as well as other objectives.

Conduit means 184 extend from the upper portions of each of the said cylinders 182 for the purpose of communicating hydraulic fluid from one cylinder to the other. Detachable caps 186 are threadedly secured to the lower portion of each of the cylinders 182 for the obvious purpose of providing a closed system. It will be noted by the aforementioned construction the front wheels of the tractor are permitted pivotal movement about the axis of the piston rods and also, shock absorbing means is inherent therewith.

While there has been described a device capable of performing all of the specifically mentioned objects as well as numerous other objects, it is apparent that various changes including omissions, additions and rearrangement of elements may be made herein without departing from the spirit of the invention. Accordingly, limitation is sought only in accordance with the scope of the appended claims.

Having described the invention, what is claimed as new is:

1. In a tractor comprising a chassis, a rear axle carried by the chassis, wheels secured to the rear axle, and an internal combustion engine supported on said chassis, a transmission means selectively drivingly interconnecting the crankshaft of said engine with said rear axle for selectively driving the tractor, said transmission means including first and second gear means in axial alignment with said first gear means selectively operably connected to said crankshaft and said second gear means selectively operably connected to the rear axle, third gear means selectively operably connected to said first and second gear means and in offset relation thereto, and a first power take-off unit carried by the chassis and driven by said third gear means, a fourth gear means axially aligned with said third gear means and selectively operably connected to said first and third gear means.

2. In a tractor comprising a chassis, a rear axle carried by the chassis, wheels secured to the rear axle, and an internal combustion engine supported on said chassis, a transmission means selectively drivingly interconnecting the crankshaft of said engine with said rear axle for selectively driving the tractor, said transmission means including first and second gear means in axial alignment with said first gear means selectively operably connected to said crank shaft and said second gear means selectively operably connected to the rear axle, third gear means selectively operably connected to said first and second gear means and in offset relation thereto, and a first power take-off unit carried by the chassis and driven by said third gear means, a fourth gear means axially aligned with said third gear means and selectively operably connected to said first and third gear means, and second power take-off means carried by said chassis and driven by said fourth gear means.

3. In a tractor comprising a chassis, a rear axle carried by the chassis, wheels secured to the rear axle, and an internal combustion engine supported on said chassis, a transmission means selectively drivingly interconnecting the crankshaft of said engine with said rear axle for selectively driving the tractor, said transmission means including first and second gear means in axial alignment with said first gear means selectively operably connected to said crankshaft and said second gear means selectively operably connected to the rear axle, third gear means selectively operably connected to said first and second gear means and in offset relation thereto, and a first power take-off unit carried by the chassis and driven by said third gear means, a fourth gear means axially aligned with said third gear means and selectively operably connected to said first and third gear means, and second power take-off means carried by said chassis and driven by said fourth gear means, said first power take-off means being disposed at the rear end of said chassis, and said second power take-off means being disposed at one side of said chassis and having its rotational axis perpendicular to the the rotational axis of said first power take-off means.

4. In a tractor comprising a chassis, a rear axle carried by the chassis, wheels secured to the rear axle, and an internal combustion engine supported on said chassis, a transmission means selectively drivingly interconnecting the crankshaft of said engine with said rear axle for selectively driving the tractor, said transmission means including first and second gear means in axial alignment with said first gear means selectively operably connected to said crankshaft and said second gear means selectively operably connected to the rear axle, third gear means selectively operably connected to said first and second gear means and in offset relation thereto, and a first power take-off unit carried by the chassis and driven by said third gear means, said first, second and third gear means including gear drives of varying gear ratios.

5. In a tractor comprising a chassis, a rear axle carried by the chassis, wheels secured to the rear axle, and an internal combustion engine supported on said chassis, a transmission means selectively drivingly interconnecting the crankshaft of said engine with said rear axle for selectively driving the tractor, said transmission means including first and second gear means in axial alignment with said first gear means selectively operably connected to said crankshaft and said second gear means selectively operably connected to the rear axle, third gear means selectively operably connected to said first and second gear means and in offset relation thereto, and a first power take-off unit carried by the chassis and driven by said third gear means, a fourth gear means axially aligned with said third gear means and selectively operably connected to said first and third gear means, said first, second, third and fourth gear means including gear drives of varying gear ratios.

JAMES K. MINOR.

REFERENCES CITED

The following references are of record in the file of this patent:

UNITED STATES PATENTS

| Number | Name | Date |
|---|---|---|
| 1,038,054 | Wolf | Sept. 10, 1912 |
| 1,073,796 | Cordero | Sept. 23, 1913 |
| 1,293,711 | Church | Feb. 11, 1919 |
| 1,369,431 | Hicks | Feb. 22, 1921 |
| 1,407,243 | Young | Feb. 21, 1922 |
| 1,527,435 | Oechsle | Feb. 24, 1925 |
| 1,603,528 | Fageol | Oct. 19, 1926 |
| 1,858,700 | Besonson | May 17, 1932 |
| 1,932,698 | Jose | Oct. 31, 1933 |
| 1,994,874 | Sams et al. | Mar. 19, 1935 |
| 2,133,549 | LeBleu | Oct. 18, 1938 |
| 2,209,804 | Ashley | July 30, 1940 |
| 2,232,992 | Alexander | Feb. 25, 1941 |
| 2,238,841 | Allgeyer | Apr. 15, 1941 |
| 2,241,193 | Garnett et al. | May 6, 1941 |
| 2,299,879 | Court | Oct. 27, 1942 |
| 2,317,135 | Crittenden et al. | Apr. 20, 1943 |
| 2,375,026 | Mott | May 1, 1945 |
| 2,439,686 | Findley | Apr. 13, 1948 |
| 2,521,729 | Keese | Sept. 12, 1950 |